(12) United States Patent
Lee et al.

(10) Patent No.: US 8,223,877 B2
(45) Date of Patent: Jul. 17, 2012

(54) APPARATUS AND METHOD FOR DETECTING SIGNAL IN MIMO SYSTEM

(75) Inventors: In-Kyu Lee, Seoul (KR); Jin-Seong Kim, Seoul (KR); Chae-Man Lim, Seoul (KR)

(73) Assignees: Samsung Electronics Co., Ltd (KR); Korea University Industrial & Academic Collaboration Foundation (KR)

( * ) Notice: Subject to any disclaimer, the term of this patent is extended or adjusted under 35 U.S.C. 154(b) by 477 days.

(21) Appl. No.: 12/481,753

(22) Filed: Jun. 10, 2009

(65) Prior Publication Data

US 2009/0304123 A1    Dec. 10, 2009

(30) Foreign Application Priority Data

Jun. 10, 2008   (KR) .................. 10-2008-0054057

(51) Int. Cl.
*H04B 7/02*   (2006.01)
*H04L 1/02*   (2006.01)

(52) U.S. Cl. ............... 375/267; 375/259; 375/260
(58) Field of Classification Search .......... 375/341, 375/267
See application file for complete search history.

(56) References Cited

U.S. PATENT DOCUMENTS

| | | | |
|---|---|---|---|
| 2007/0116143 A1* | 5/2007 | Bjerke et al. | 375/262 |
| 2007/0162827 A1* | 7/2007 | Walton et al. | 714/774 |
| 2008/0198943 A1* | 8/2008 | Milliner et al. | 375/267 |
| 2009/0052561 A1* | 2/2009 | Baxley et al. | 375/260 |
| 2009/0197630 A1* | 8/2009 | Ahn et al. | 455/522 |
| 2011/0038275 A1* | 2/2011 | Kim et al. | 370/252 |

* cited by examiner

*Primary Examiner* — David C. Payne
*Assistant Examiner* — Erin File
(74) *Attorney, Agent, or Firm* — The Farrell Law Firm, P.C.

(57) ABSTRACT

An apparatus and method for detecting a signal in a Multiple-Input Multiple-Output (MIMO) system are provided. The method includes filtering each stream of a received signal, acquiring a new search space by acquiring a set of candidates having reliability greater than a threshold with respect to each filtered stream, and detecting a signal for each stream of the new search space.

14 Claims, 9 Drawing Sheets

APPARATUS AND METHOD FOR DETECTING SIGNAL IN MIMO SYSTEM

PRIORITY

This application claims priority under 35 U.S.C. §119(a) to a Korean patent application filed in the Korean Intellectual Property Office on Jun. 10, 2008 and assigned Serial No. 10-2008-0054057, the entire disclosure of which is incorporated herein by reference.

BACKGROUND OF THE INVENTION

1. Field of the Invention

The present invention relates to an apparatus and a method for detecting a signal with a low complexity and a performance similar to Maximum Likelihood (ML) detection, by reducing a search space in a Multiple-Input Multiple-Output (MIMO) system.

2. Description of the Related Art

In a multi-antenna system utilizing Multiple-Input Multiple-Output (MIMO), an optical detection scheme for receiving a plurality of independent symbols via the multiple antennas is a Maximum Likelihood (ML) detection in terms of a symbol error rate.

Disadvantageously, however, the high complexity of the ML detection method complicates its implementation. Therefore, various linear detection schemes, for example, detection schemes using Zero Forcing (ZF) or Minimum Mean Square Error (MMSE) have been utilized, and a nonlinear Vertical-Bell Labs layered Space Time (V-BLAST) has been used as well.

Still, these schemes do not always provide satisfactory performance. In this regard, schemes demonstrating the performance similar to the ML scheme with a little more complexity have been suggested.

For example, a QR decomposition with M-algorithm (QRM-MLD) and a Sphere Decoding (SD) scheme execute a tree search algorithm using QR decomposition. Q denotes an orthogonal matrix and R denotes an upper triangular matrix.

The QRM-MLD scheme exhibits a lower complexity than the ML scheme but still has a large number of symbol candidates to consider. The SD scheme suffers the considerable change of the complexity according to a radius of a hyper-sphere.

SUMMARY OF THE INVENTION

The present invention has been designed to address at least the above-mentioned problems and/or disadvantages and to provide at least the advantages described below. Accordingly, an aspect of the present invention is to provide an apparatus and a method for detecting a signal in a Multiple-Input Multiple-Output (MIMO) system.

Another aspect of the present invention is to provide an apparatus and a method for detecting a signal with a performance similar to a Maximum Likelihood (ML) scheme and a low complexity in a MIMO system.

In accordance with an aspect of an embodiment of the present invention, a method for detecting a receive signal of a receiver in a MIMO system is provided. The method includes filtering each stream of a received signal; acquiring a new search space by acquiring a set of candidates having reliability greater than a threshold with respect to each filtered stream; and detecting a signal for each stream of the new search space.

In accordance with another aspect of an embodiment of the present invention, an apparatus of a receiver in a MIMO system is provided. The apparatus includes a filter for filtering each stream of a received signal; a candidate set acquirer for acquiring a new search space by calculating a set of candidates having a reliability greater than a threshold with respect to each filtered stream; and a detector for detecting a signal for each stream of the new search space.

BRIEF DESCRIPTION OF THE DRAWINGS

The above and other aspects, features, and advantages of certain embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EMBODIMENTS OF THE PRESENT INVENTION

The following description with reference to the accompanying drawings is provided to assist in a comprehensive understanding of certain embodiments of the present invention as will be defined by the claims and their equivalents. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

Embodiments of the present invention provide an apparatus and a method for detecting a signal in a Multiple-Input Multiple-Output (MIMO) system.

More specifically, in accordance with an embodiment of the present invention, symbols of bare possibility are removed from transport streams using a Minimum Mean Square Error (MMSE) scheme, which drastically reduce a search space.

Accordingly, a probability metric is defined using a normalized likelihood function. Hereinafter, $(\ )^{-1}$ denotes an inverse function, $(\ )^T$ denotes a transpose operation, and $(\ )^H$ denotes a Hermitian transpose operation.

Figure 1:
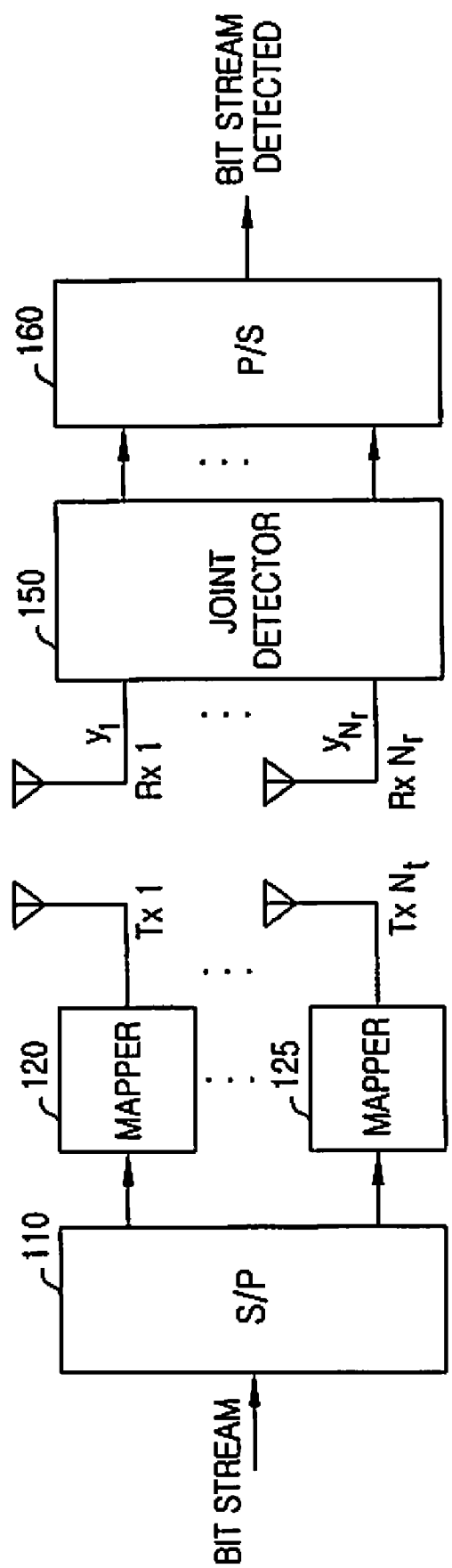
FIG. 1 is a diagram of a simplified system model including multiple antennas according to an embodiment of the present invention.

FIG. 1 illustrates a simplified system model including multiple antennas according to an embodiment of the present invention.

The system model of FIG. 1 includes a transmitter and a receiver. The transmitter includes a serial-parallel (S/P) converter 110 and mappers 120 and 125. The receiver includes a joint detector 150 and a parallel-serial (P/S) converter 160.

The S/P converter 110 converts an input bit stream to a parallel bit stream. The mappers 120 and 125 map the input bit stream to subcarriers.

The joint detector 150 detects and outputs the bit stream received via a plurality of antennas. The P/S converter 160 converts the fed bit stream to the serial bit stream.

Given a frequency parallel channel, a baseband system model may be generally expressed as shown in Equation (1).

$$y = Hs + n \quad (1)$$

In Equation (1), $s=[s_1 \ldots s_{N_t}]^T$ denotes a symbol vector transmitted from the transmitting end and $y=[y_1 \ldots y_{N_r}]^T$ denotes a receive signal vector. n denotes a complex Additive White Gaussian Noise (AWGN) noise. H denotes a channel matrix of $N_r \times N_t$. Elements of the channel matrix are independent of each other and form a complex Gaussian distribution with a mean '0' and a variance '1'. It is assumed that the receiver is fully aware of H.

The transmitted symbols belong to a complex constellation C having the mean '0', the variance $\sigma_s^2$, and a modulation unit M. A covariance matrix of the noise vector n is assumed to be $\sigma_n^2 I$.

In accordance with an embodiment of the present invention, the receive signal passes through a linear filter as shown in Equation (2), derived using the MMSE.

$$G = \left(H^H H + \frac{\sigma_n^2}{\sigma_s^2} I\right)^{-1} H^H \quad (2)$$

In Equation (2), H denotes the channel matrix of $N_r \times N_t$, $(\ )^H$ denotes a Hermitian transpose operation. $(\ )^{-1}$ denotes an inverse function, $\sigma_s^2$ denotes the variance.

The symbol vector estimated using the MMSE filter based on Equation (2) is expressed as shown in Equation (3).

$$\tilde{s} = GHs + v \quad (3)$$

In Equation (3), $v=[v_1 \ldots v_{N_t}]^T$ is the filtered noise vector and $v=Gn$.

Provided that the i-th symbol estimation value is $\tilde{s}_i$, $\tilde{s}_i = \beta_i s_i + w_i$. $\beta_i = g_i h_i$ denotes a bias generated by the filter and $$w_i = \sum_{j=1, j \neq i}^{N_t} g_i h_j s_j + v_i$$

denotes a sum of the remaining interference and noise.

$g_i$ denotes the i-th column of the matrix G. Provided that $w_i$ is the Gaussian probability distribution, it may be considered as a complex Gaussian variable having the mean '0' and the variance $\sigma_{w,i}^2$.

The conditional Probability Density Function (PDF) for $\tilde{s}_i$ may be expressed as shown in Equation (4).

$$p(\tilde{s}_i | s_i = \rho_m) = \frac{1}{\pi \sigma_{w,i}^2} \exp\left(-\frac{|\tilde{s}_i - \beta_i s_i|^2}{\sigma_{w,i}^2}\right) \quad (4)$$

In Equation (4), $\rho_m \in C$ (m=1, . . . ,M) denotes one of constellation symbols. The variance $\sigma_{w,i}^2$ may be acquired using $\sigma_{w,i}^2 = \sigma_s^2 \beta_i (1-\beta_i)$ according to the derivation.

A method for reducing the search space of the candidate symbol vectors required in the ML detection will now be explained below.

First, a probability threshold $\alpha$ ($0 \leq \alpha \leq 1$) is set, which is used to define a range of the symbols to search. Thereafter, a conditional probability normalized for each symbol of the next i-th stream is determined based on Equation (5).

$$\xi_m^i \triangleq \frac{p(\tilde{s}_i | s_i = \rho_m)}{\sum_{j=1}^{M} p(\tilde{s}_i | s_i = \rho_j)}, 1 \leq m \leq M \quad (5)$$

In Equation (5), $\xi_m^i$ denotes a reliability of the symbol candidate $\rho_m$ in the i-th stream. $p(\tilde{s}_i | s_i = \rho_m)$ denotes the conditional Probability Density Function (PDF) for $\tilde{s}_i$, $\rho_m$, (m=1, . . . ,M) denotes one of constellation symbols.

Preferably, the symbol candidates of the highest reliability are independently determined in each stream.

Provided that the number of the symbol candidates selected in the i-th stream is $N_i$, $N_i$ denotes a minimum size of the symbol set having the sum of the normalized probabilities greater than $\alpha$. This set is defined as $\hat{C}_i$. For example, given $\xi_1^i \geq \xi_2^i \geq \ldots \geq \xi_M^i$, $N_i$ is given by Equation (6).

$$N_i = \arg\min_{1 \leq n \leq M} \left(\sum_{j=1}^{n} \xi_j^i \geq \alpha\right) \quad (6)$$

The selected candidate set is $\hat{C}_i = \{\rho_1, \ldots, \rho_{N_i}\}$.

From the selected candidate sets $\{\hat{C}_i\}_{i=1}^{N_i}$, a newly reduced search space $\hat{C} = \hat{C}_1 \times \ldots \times \hat{C}_{N_t}$ may be acquired. $\hat{C}$ has N-ary selected symbol vectors, where n denotes the total number of the candidate symbol vectors and is expressed as $$\prod_{i=1}^{N_t} N_i.$$

The ML detection of the present invention is performed using the reduced transmit symbol candidate vectors belonging to $\hat{C}$ based on Equation (7).

$$\hat{s} = \underset{s \in \hat{C}}{\arg\min} \|y - Hs\| \quad (7)$$

In Equation (7), $s=[s_1 \ldots s_{N_t}]^T$ denotes the symbol vector transmitted from the transmitting end and $y=[y_1 \ldots y_{N_r}]^T$ denotes the receive signal vector. H denotes the channel matrix of $N_r \times N_t$.

According to the simulation result, the present scheme exhibits a smaller search amount than the conventional detection methods, but also provides the optimal performance.

An algorithm for extracting a soft Log-Likelihood Ratio (LLR) value will now be described below.

The above-mentioned algorithm attains the optimal performance when the channel coding is not used. However, if the channel coding is applied to the entire system, there are some additional problems to consider.

When the transmitting end performs the channel decoding, the receiving end decodes the received signal using the LLR value. Although the accuracy of the LLR value is one crucial factor affecting system performance, there is no efficient LLR calculation algorithm in the conventional SD and QRD-M schemes.

Hence, these two schemes feature almost optimized performance in the uncoded system, but degrade performance compared to the conventional simple reception schemes.

The cause of the system degradation in the two schemes is the lack of the number of the candidates in the reduced search space. However, in accordance with an embodiment of the present invention, the search space $\hat{C}$ is defined according to the reliability of the performance per layer and thus the candidates in $\hat{C}$ may produce the relatively accurate LLR value.

The LLR extraction algorithm of the low complexity for the present scheme will now be described below.

When the channel coding is performed at the transmitting end, the receiving end determines the LLR value of the received signal based on Equation (8) and performs the decoding.

$$L(b_{i,j}) = \log \frac{\sum_{s \in Q_{i,j}^1} \exp\left(-\frac{\|y - Hs\|^2}{\sigma_n^2}\right)}{\sum_{s \in Q_{i,j}^0} \exp\left(-\frac{\|y - Hs\|^2}{\sigma_n^2}\right)} \quad (8)$$

In Equation (8), $b_{i,j}$ denotes the j-th bit in the i-th stream and $Q_{i,j}^d$ denotes a set of symbol vectors having $b_{i,j}$ of $d \in \{0,1\}$.

In accordance with an embodiment of the present invention, the LLR extraction algorithm has less complexity. Accordingly, the LLR value is acquired using the reduced search space $\hat{C} = \hat{C}_1 \times \ldots \times \hat{C}_{N_t}$. That is, the LLR is determined within the restricted space based on Equation (9).

$$L(b_{i,j}) \approx \log \frac{\sum_{s \in \hat{C}_{i,j}^1} \exp\left(-\frac{\|y - Hs\|^2}{\sigma_n^2}\right)}{\sum_{s \in \hat{C}_{i,j}^0} \exp\left(-\frac{\|y - Hs\|^2}{\sigma_n^2}\right)} \quad (9)$$

In Equation (9), $\hat{C}_{i,j}^d$ denotes a subset of $\hat{C}$, which is the set of the symbol vectors having $b_{i,j}$ of $d \in \{0,1\}$.

The graph of the simulation result shows the utmost reduction of the search space of the present invention. However, the present invention is subject to the shortcomings similar to the SD and the QRD-M.

While the reduction of the number of the candidates to consider is desirable, the LLR value of a specific bit may be $\pm\infty$ when the LLR value is determined with the reduced candidates.

When $\hat{C}_{i,j}^1 = \phi$ or $\hat{C}_{i,j}^0 = \phi$, the LLR value is not limited. When the LLR value is not limited and $\pm\infty$ exists, it is widely known that the system performance is greatly degraded.

Thus, given $\hat{L}(b_{i,j}) = \pm\infty$, in accordance with an embodiment of the present invention the corresponding $b_{i,j}$ is substituted with the LLR value acquired through the MMSE filtering.

At this time, additional complexity is not required because the MMSE-filtered LLR value of Equation (10) may be acquired easily using the conditional probability distribution values $\zeta_m^i$ normalized for $\zeta_m^i$ acquired when $\hat{C} = \hat{C}_1 \times \ldots \times \hat{C}_{N_t}$ is computed.

$$L(b_{i,j}) \approx \frac{\sum_{s_i \in Q_{i,j}^1} p(s_i | \tilde{s}_i)}{\sum_{s_i \in Q_{i,j}^0} p(s_i | \tilde{s}_i)} = \quad (10)$$

$$\frac{\sum_{s_i \in Q_{i,j}^1} \exp\left(-\frac{\|\tilde{s}_i - \beta_i s_i\|^2}{\sigma_{w,i}^2}\right)}{\sum_{s_i \in Q_{i,j}^0} \exp\left(-\frac{\|\tilde{s}_i - \beta_i s_i\|^2}{\sigma_{w,i}^2}\right)} = \frac{\sum_{s_i \in Q_{i,j}^1} \xi_m^i \Big|_{s_i = \rho_m}}{\sum_{s_i \in Q_{i,j}^0} \xi_m^i \Big|_{s_i = \rho_m}}$$

In Equation (10), $s = [s_1 \ldots s_{N_t}]^T$ denotes the symbol vectors transmitted from the transmitting end.

Provided that the i-th symbol estimation value is defined to $\tilde{s}_i$, $\tilde{s}_i = \beta_i s_i + w_i$. $\beta_i = g_i h_i$ denotes a bias generated by the filter and $$w_i = \sum_{j=1, j \neq i}^{N_i} g_i h_j s_j + v_i$$

denotes a sum of the remaining interference and noise.

$g_i$ denotes the i-th column of G. Provided that $w_i$ is the Gaussian probability distribution, it may be represented as a complex Gaussian variable having the mean '0' and the variance $\sigma_{w,i}^2$.

Figure 2:
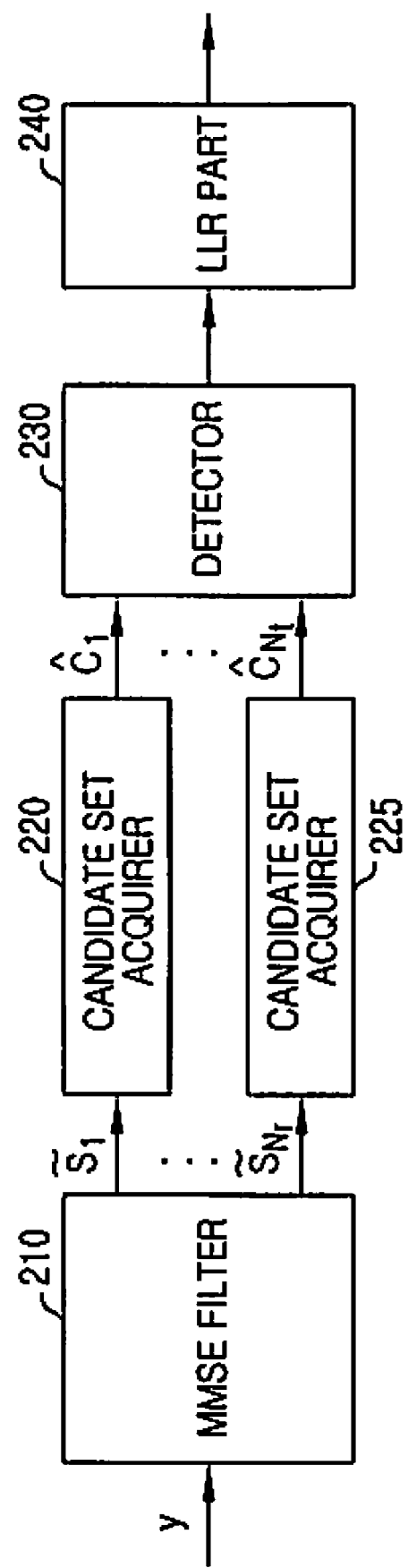
FIG. 2 is a block diagram of a receiving end according to an embodiment of the present invention.

FIG. 2 is a block diagram of the receiving end according to an embodiment of the present invention.

In the receiver, the block structure for detecting the signal is illustrated in FIG. 2. The receiving end includes an MMSE filter 210, candidate set acquirers 220 and 225, a detector 230, and an LLR part 240.

The MMSE filter 210 estimates the symbol vector by MMSE-filtering the received signal and outputs the estimated symbol vector. The MMSE filtering is performed based on Equation (2), and the estimated symbol vector detected through the MMSE filtering is given by Equation (3).

The candidate set acquirers 220 and 225 select the candidate set per received stream i.

The candidate set selection acquires the candidate set including the symbol vectors having the reliability greater than the probability threshold $\alpha$ among the symbol vectors estimated per receive stream, based on Equation (5) and Equation (6).

The detector 230 detects the final transmit symbol using the ML detection of Equation (7) based on the transmit symbol vectors of the candidate sets output from the candidate set acquirers 220 and 225.

The LLR part 240 determines the soft LLR value using the final symbol vector output from the detector 230 based on Equation (9).

When the soft LLR value is $\pm\infty$, the corresponding symbol is replaced by the soft LLR value acquired through the MMSE filtering based on Equation (10).

Figure 3:
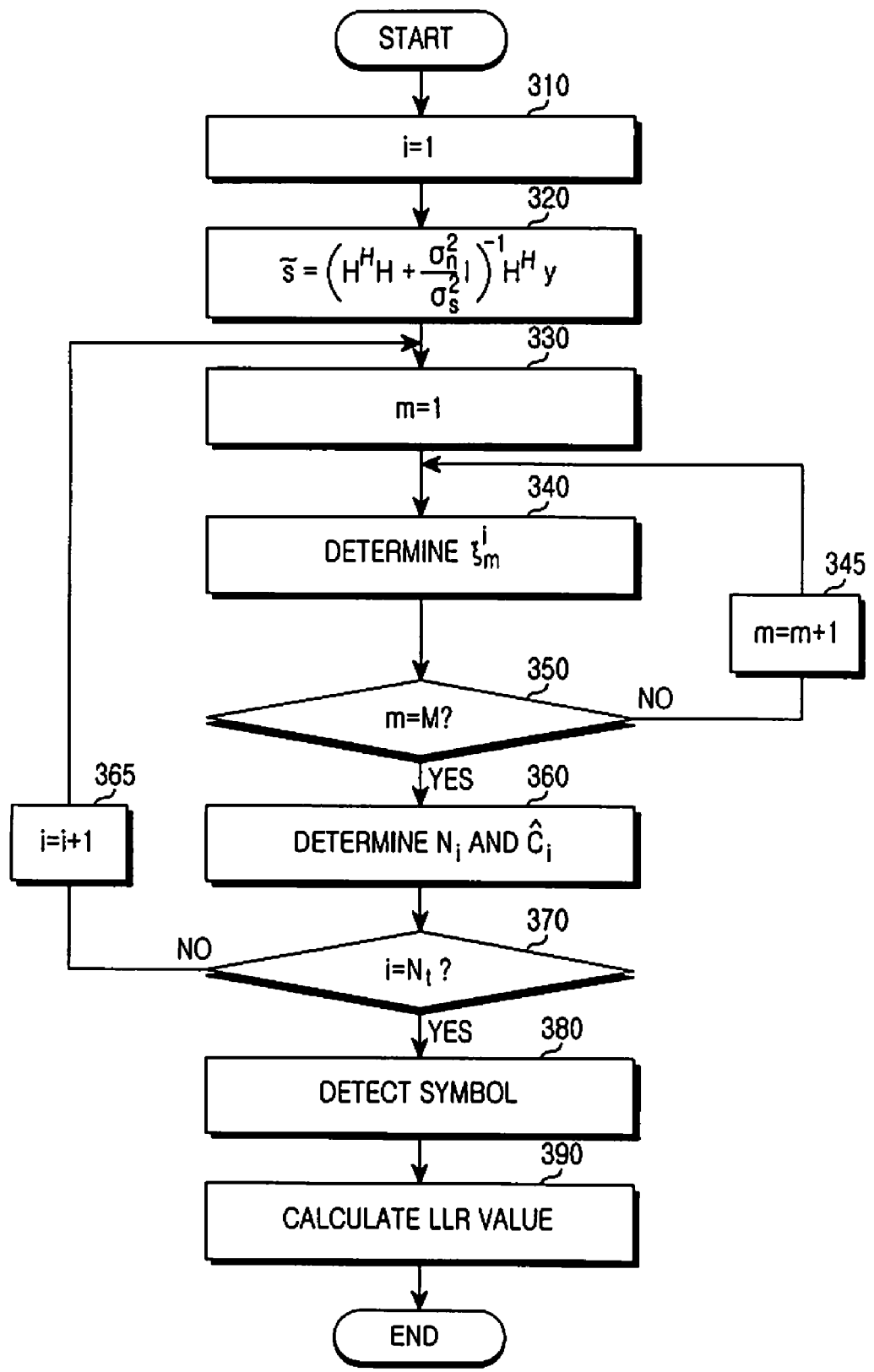
FIG. 3 is a flowchart of operations of the receiving end according to an embodiment of the present invention.

FIG. 3 is a flowchart of operations of the receiving end according to an embodiment of the present invention.

The receiving end MMSE-filters the first stream i=1 of the received signal of step 310 in step 320. The MMSE filtering is expressed as shown in Equation (2), and the estimated symbol vector detected through the MMSE filtering is expressed as shown in Equation (3).

To acquire the M-ary constellation symbols, the probability of the reliability of the estimated symbol vectors per received stream is repeatedly determined based on Equation (5) in steps 330, 340, and 350. The calculating of the probability of the reliability of the estimated symbol vectors per receive stream is repeated until the variable m increasing by 1 is equal to M.

In step 360, the receiving end acquires the candidate set including the symbol vectors having the probability value of the reliability greater than the probability threshold α based on Equation (6). Step 360 is performed for each stream. When the current stream is not the last stream in step 370, the receiving end repeats the steps 330 through 360 in the next stream in step 365. Herein, i denotes the stream.

In step 380, the receiving end detects the final transmit symbol vector using the ML detection based on the transmit symbol vectors of the candidate set in accordance with Equation (7).

In step 390, the receiving end determines the soft LLR value of the final transmit symbol vector based on Equation (9). When the soft LLR value is ±∞, the corresponding symbol is replaced by the soft LLR value acquired through the MMSE filtering based on Equation (10).

The following description provides analysis results of the performance of the present scheme in the frequency parallel channel, and the results when the present scheme is applied to the terminal reception of 3rd Generation Partnership Project (3GPP)-Long Time Evolution (LTE).

The QRD-MLD algorithm compared is simulated by setting the parameter M to 1M, 0.75M, and 0.5M, and the radius of the SD algorithm is set to a great value enough to yield the optimum performance both at the low SNR and at the high SNR. The number of the antennas is set to $N_t=N_r=4$.

Figure 4:
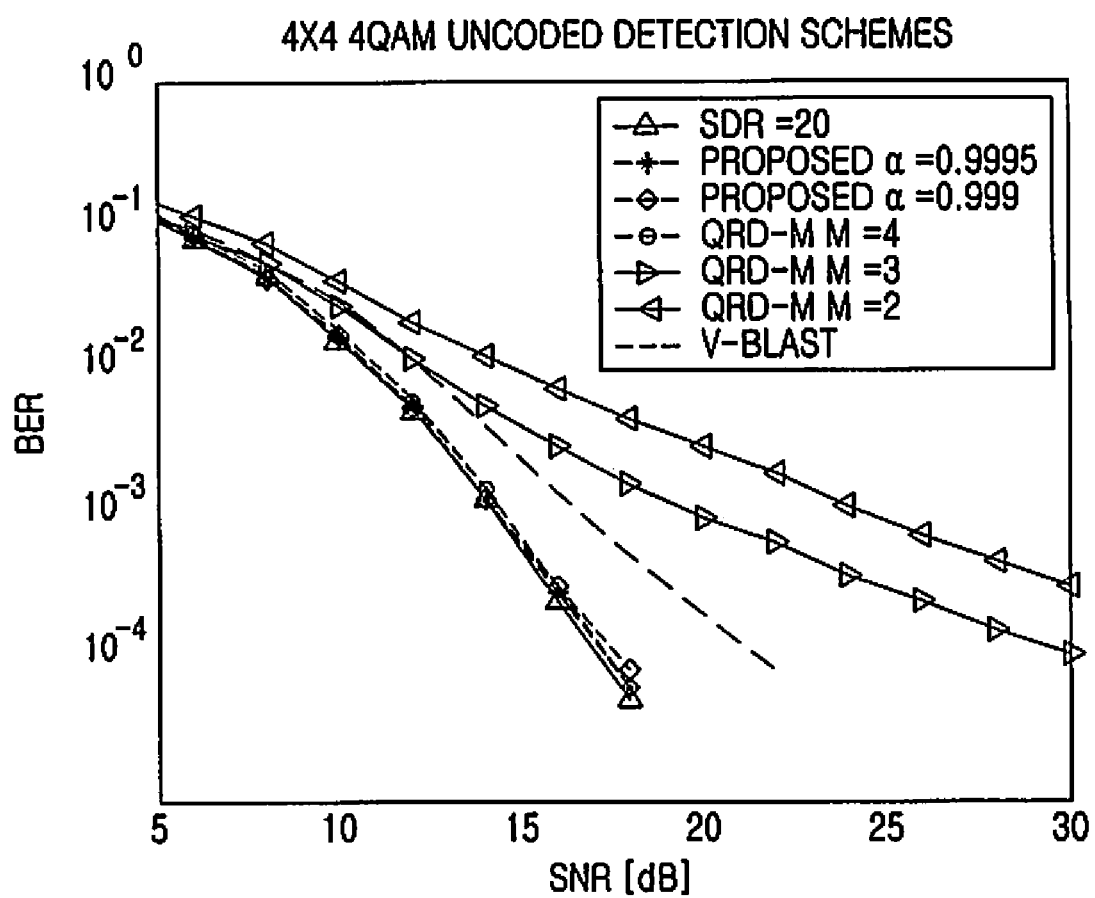
FIG. 4 is a graph for comparing Bit Error Rate (BER) performance in 4×4 and 4 QAM according to an embodiment of the present invention.

FIG. 4 is a graph for comparing Bit Error Rate (BER) performance in 4×4 and 4 Quadrature Amplitude Modulation (QAM) according to an embodiment of the present invention.

FIG. 4 illustrates the performance of various schemes in the 4 QAM. When M is 4 in the QRM-MLD, the present invention exhibits almost the similar performance to the SD scheme.

When α=0.9995 at the BER $10^{-4}$, the present invention reveals the optimum performance. At α=0.9999, the present invention may achieve substantially the similar performance. Compared to the Vertical-Bell Laboratories-Layered-Space-Time (VBLAST) scheme applying the MMSE ordering, the present invention may attain the gain of about 5 dB.

Figure 5:
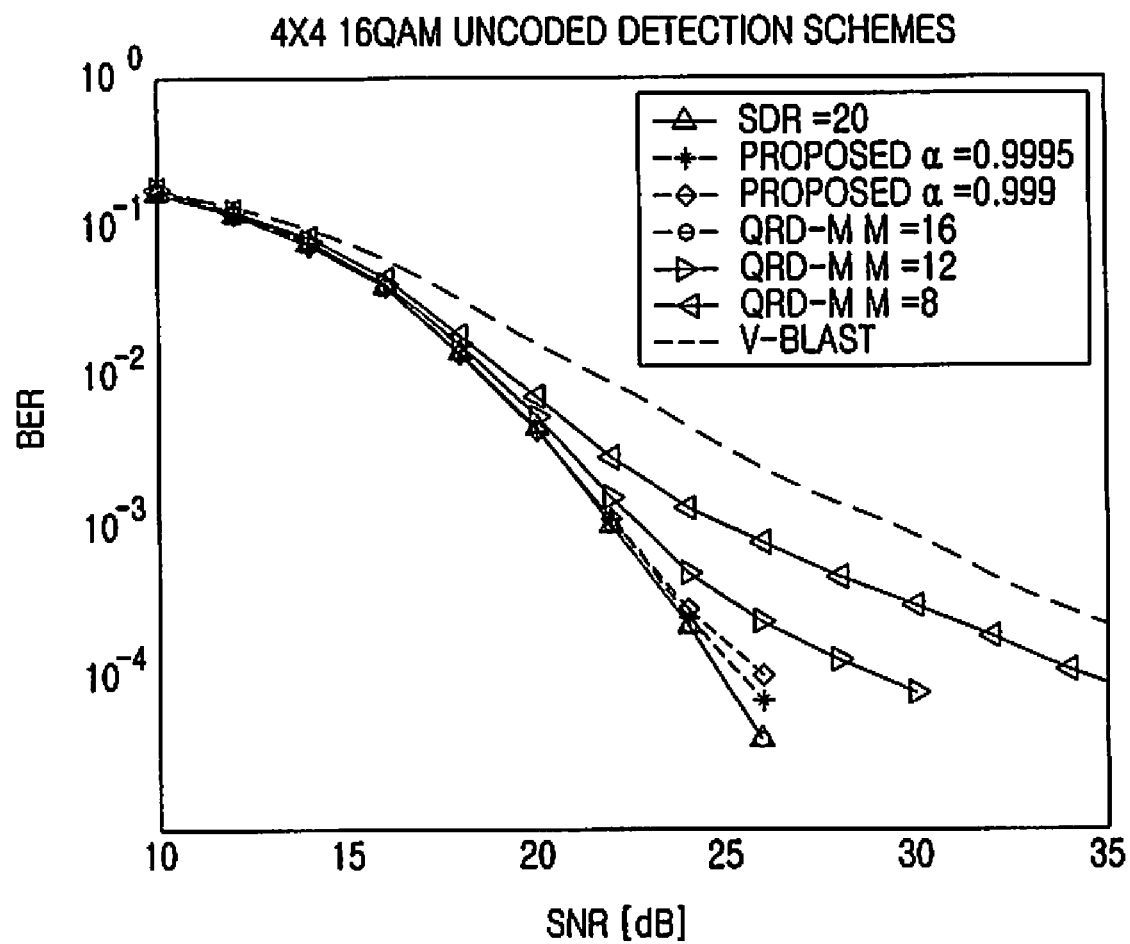
FIG. 5 is a graph for comparing the BER performance in 4×4 and 16 QAM according to an embodiment of the present invention.

FIG. 5 is a graph for comparing the BER performance in 4×4 and 16 QAM according to an embodiment of the present invention.

FIG. 5 illustrates the BER of various schemes in the 16 QAM. When M is 16 in the QRM-MLD based on the BER $10^{-4}$, the present invention also yields the performance almost similar to the SD scheme.

Accordingly, the present invention achieves the optimal performance at α=0.9995. Even when α is lowered to 0.999, the present invention may ensure its performance within about 1 dB relative to the SD.

Compared to the VBLAST, the present invention may increase the gain and attain the gain of about 13 dB. That is, the QRD-MLD reveals the abrupt performance degradation in relation to the value M, whereas the performance of the present invention yields the relatively less performance change in relation to α.

To compare the complexity, the average number of the searched candidates and the average number of the real multiplications of the algorithms are arranged in Table 1 below. More specifically, in Table 1, Signal to Noise Ratio (SNR) at the BER $10^{-4}$ is the criterion and set to 18 dB and 26 dB with respect to the 4 QAM and the 16 QAM respectively.

TABLE 1

| Algorithms | 4QAM (18 dB) | | 16QAM (26 dB) | |
| --- | --- | --- | --- | --- |
| | # of cand. | # of mult. | # of cand. | # of mult. |
| MLD | 256 | 2304 | 65536 | 525312 |
| SD R = 20 | 69.7 | 629.49 | 159.3 | 1460 |
| QRM-MLD M = M | 52 | 408 | 784 | 5088 |
| QRM-MLD M = 0.75M | 40 | 312 | 592 | 3840 |
| QRM-MLD M = 05M | 28 | 216 | 400 | 2592 |
| Proposed α = 0.9995 | 3.95 | 116.4 | 77.91 | 739.7 |
| Proposed α = 0.999 | 3.45 | 110.0 | 60.88 | 598.4 |

In Table 1, to achieve the same performance, the present invention requires much less complexity than the conventional near-ML algorithms.

Assuming α=0.9995 in the 4 QAM, it is expected that the number of the searched candidates will decrease by 92.4% and the number of the multiplications will decrease by 71.5% in average, compared to M=4 in the QRM-MDL. Relative to the QRM-MLD with M=16 in the 16 QAM, the searched candidates and the number of the real-number multiplications may be spared by 90.1% and 85.5% respectively.

In terms of the complexity, the present invention is superior to the SD. The present invention may further lower the complexity by decreasing α to 0.999.

The present invention also enhances the performance in the actual system using the channel coding. The gain greatly differs depending on how accurate LLR value is extracted. The present invention determines the LLR based on each bit using only the candidates selected by α. The bit of the insufficient LLR value is substituted with the LLR value acquired by the conventional MMSE filtering.

Figure 6:
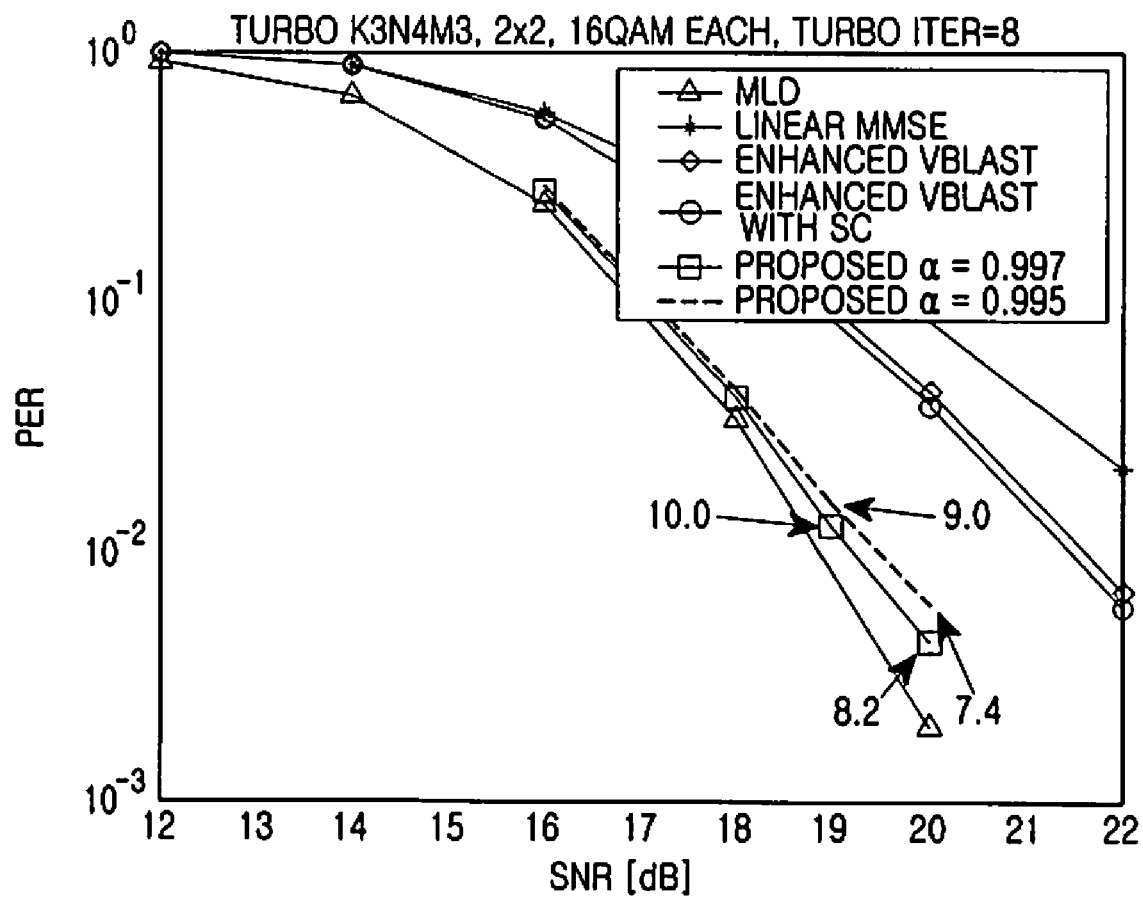
FIG. 6 is a graph for comparing a Packet Error Rate (PER) performance in 2×2 and 16 QAM according to an embodiment of the present invention.

FIG. 6 is a graph for comparing a Packet Error Rate (PER) performance in 2×2 and 16 QAM according to an embodiment of the present invention.

FIG. 6 illustrates the performance at ¾ code rate in the 2×2 16 QAM system. The value indicated by the arrow is the average number of the candidates required at each SNR.

The MLD takes into account 256 candidates in total regardless of the SNR, whereas the present scheme considers 10.0 candidates and 8.2 candidates at α=0.997 and 9.0 candidates and 7.4 candidates at α=0.997 based on the SNR 19 dB and 20 dB respectively. In this situation, the performance stays within about 1 dB at the PER $10^{-4}$, compared to the MLD.

Compared to the enhanced VBLAST algorithm in the channel coding system, the present invention yields superior performance by about 2 dB. In addition, the present invention may expect the gain more than 3 dB or so, compared to the MMSE receiver.

Figure 7:
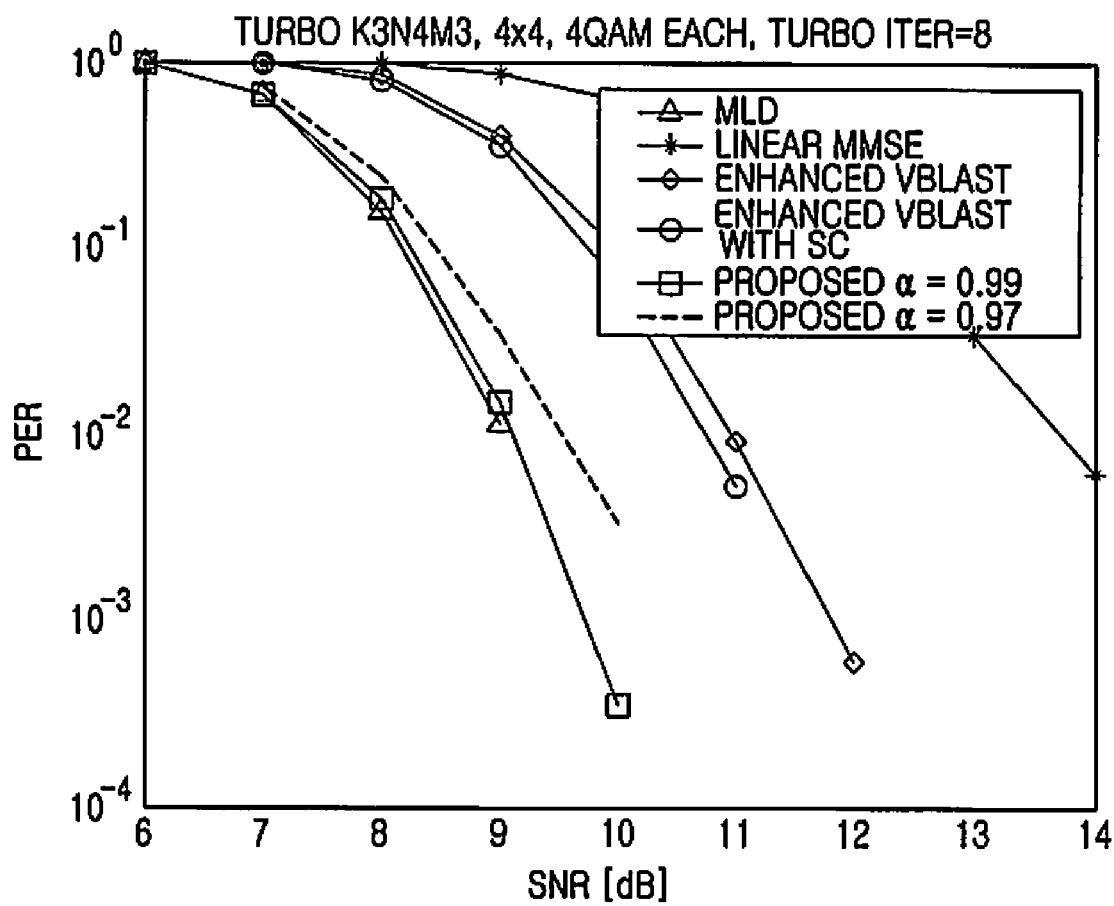
FIG. 7 is a graph for comparing the PER performance in 4×4 and 4 QAM according to an embodiment of the present invention.

FIG. 7 is a graph for comparing the PER performance in 4×4 and 4 QAM according to an embodiment of the present invention.

Given the average number of the candidates under consideration based on 9 dB and 10 dB, the MLD still takes into account 256 candidates in total regardless of the SNR, whereas the present scheme takes into account 16.6 candidates and 12.3 candidates at α=0.99 and 9.7 candidates and 7.4 candidates at α=0.97.

Only if the same spectral efficiency is tuned, the number of the antennas is irrelevant and the optimal performance may be expected with the similarly low complexity.

In comparison with the enhanced VBLAST, the present invention achieves about 2 dB and the performance difference from the MMSE receiver is close to 5 dB or so. That is, even when the number of the antennas is increased, this difference sustains.

It is advantageous to clip the number of the candidates to consider in every execution.

Figure 8:
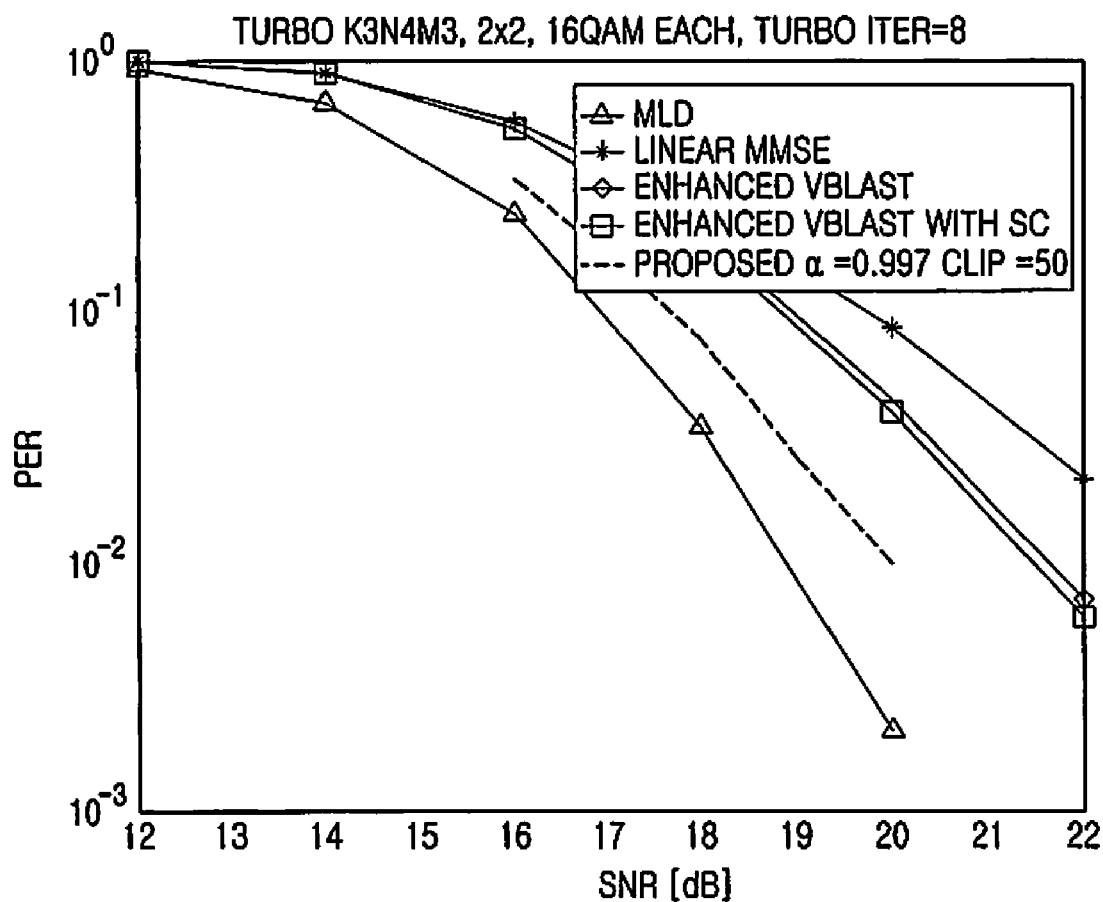
FIG. 8 is a graph for showing PER performance degradation in 2×2 and 16 QAM with clipping according to an embodiment of the present invention.

FIG. 8 is a graph for showing PER performance degradation in 2×2 and 16 QAM according to an embodiment of the present invention.

In FIG. 8, the maximum number of the candidates to consider is limited to 50 in the system of 2×2, 16 QAM, and ¾ code rate. When the candidates exceeding 50 need to be considered in the LLR calculation using the ML, the LLR value by the MMSE is used as it is.

When α is set to 0.997, the performance degradation with the clipping is not so great relative to the performance degradation without the clipping.

Figure 9:
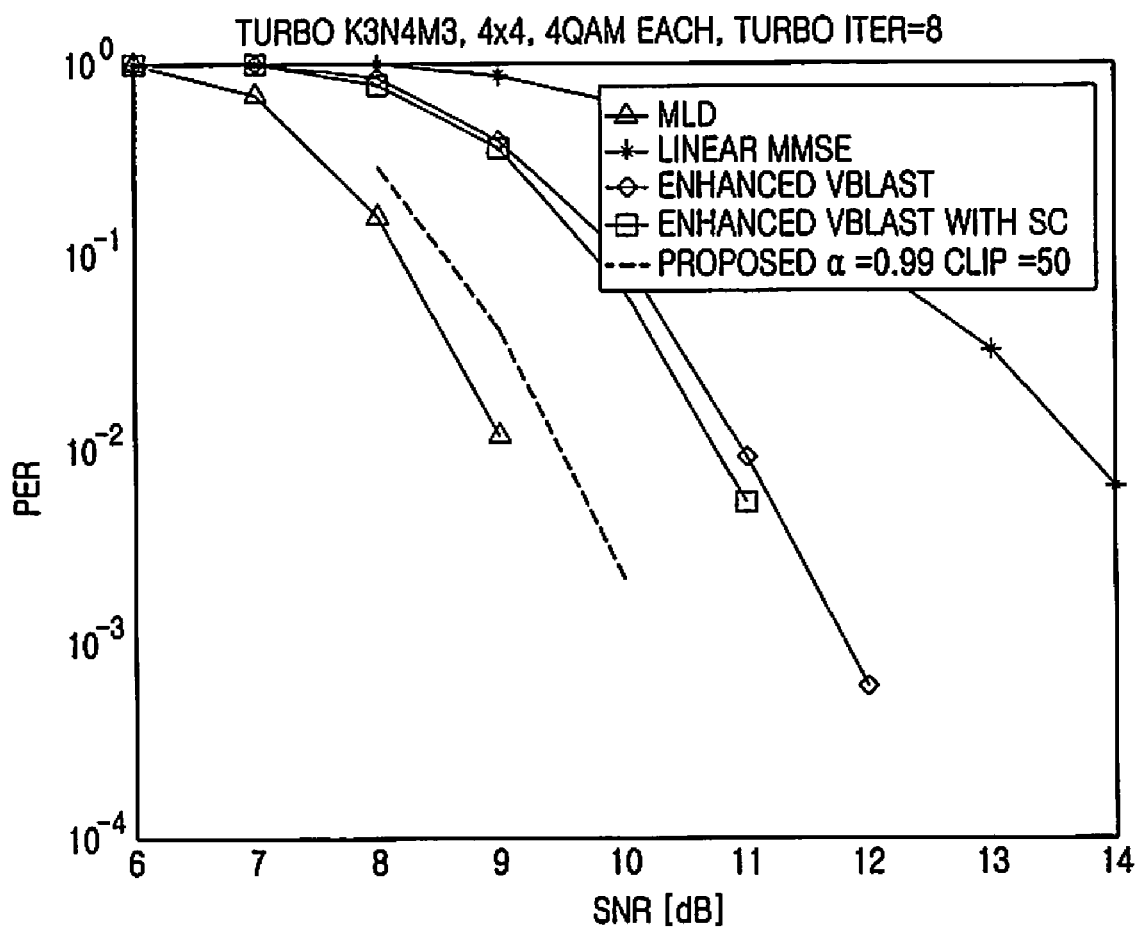
FIG. 9 is a graph for showing the PER performance degradation in 4×4 and 4 QAM with clipping according to an embodiment of the present invention.

FIG. 9 is a graph for illustrating the PER performance degradation in 4×4 and 4 QAM according to an embodiment of the present invention.

FIG. 9 illustrates the result of 4×4, 4 QAM, and ¾ code rate, and the performance when the maximum number of the candidates to consider is limited to 50 at α=0.99.

Referring to FIG. 9, the performance degradation is not so considerable merely by use of the conventional clipping without particular LLR normalization. The average number of the candidates to consider is reduced relative to the number of the candidates prior to the clipping, and only 12.2 candidates and 9.9 candidates are considered in average based on 9 dB and 10 dB.

The results of FIGS. 8 and 9 demonstrate that the present scheme is more efficient than the conventional near-ML schemes in terms of not only the average number of the candidates but also the reliability of the candidates.

Yet, in the actual implementation, the maximum complexity may precede the average complexity of the system. In this respect, a case where the maximum complexity is restricted using the clipping in the suggested scheme is experimented.

FIGS. 8 and 9 demonstrate the performance difference from the ML within 0.5 dB without the normalization of the LLR in the 4×4, and the near-ML optimality of the present invention at the high code rate.

The reduced number of the candidates causes a serious performance degradation of the LLR value in the system adopting the channel coding, whereas the present invention exhibits little difference from the optimized algorithm of the ML in the performance by considering much less symbol candidates in every environment.

The present invention may achieve the performance similar to the ML scheme, but drastically reduce the search space by removing the symbols of bare possibility in each transport stream. Therefore, the complexity is lowered.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for detecting a receive signal of a receiver in a Multiple-Input Multiple-Output (MIMO) system including a filter, a candidate set acquirer, and a detector, the method comprising:
   filtering, by the filter, each stream of a received signal;
   acquiring, by the candidate set acquirer, a new search space by acquiring a set of candidates having reliability greater than a threshold with respect to each filtered stream; and
   detecting, by the detector, a signal for each stream of the new search space,
   wherein the filtering is performed using:

$$G = \left(H^H H + \frac{\sigma_n^2}{\sigma_s^2} I\right)^{-1} H^H,$$

where H denotes a channel matrix of $N_r \times N_t$, $(\,)^H$ denotes a Hermitian transpose operation, $(\,)^{-1}$ denotes an inverse function, and $\sigma_s^2$ denotes a variance.

2. The method of claim 1, further comprising:
   calculating a soft Log Likelihood Ratio (LLR) value for each of the signal-detected streams.

3. The method of claim 2, wherein the soft LLR value is determined using:

$$L(b_{i,j}) \approx \log \frac{\sum_{s \in \hat{C}_{i,j}^1} \exp\left(-\frac{\|y - Hs\|^2}{\sigma_n^2}\right)}{\sum_{s \in \hat{C}_{i,j}^0} \exp\left(-\frac{\|y - Hs\|^2}{\sigma_n^2}\right)},$$

where $\hat{C}_{i,j}^d$ a subset of $\hat{C}$, which is a set of symbol vectors having $b_{i,j}$ of $d \in \{0,1\}$, $L(\,)$ denotes a soft LLR value and when $L(b_{i,j}) = \pm\infty$, the corresponding $b_{i,j}$ is substituted by a value determined using:

$$L(b_{i,j}) \approx \frac{\sum_{s_i \in Q_{i,j}^1} p(s_i \mid \tilde{s}_i)}{\sum_{s_i \in Q_{i,j}^0} p(s_i \mid \tilde{s}_i)} = \frac{\sum_{s_i \in Q_{i,j}^1} \exp\left(-\frac{|\tilde{s}_i - \beta_i s_i|^2}{\sigma_{w,i}^2}\right)}{\sum_{s_i \in Q_{i,j}^0} \exp\left(-\frac{|\tilde{s}_i - \beta_i s_i|^2}{\sigma_{w,i}^2}\right)} = \frac{\sum_{s_i \in Q_{i,j}^1} \xi_m^i \Big|_{s_i = p_m}}{\sum_{s_i \in Q_{i,j}^0} \xi_m^i \Big|_{s_i = p_m}},$$

where $s = [s_1 \ldots s_{N_t}]^T$ denotes symbol vectors transmitted from a transmitting end, $\tilde{s}_i$, which is defined as the i-th symbol estimation value, is expressed as $\tilde{s}_i = \beta_i s_i + w_i$, $\beta_i = g_i h_i$, denotes a bias generated by a filter, and $$w_i = \sum_{j=1, j \neq i}^{N_t} g_i h_j s_j + v_i$$

denotes a sum of remaining interference and noise.

4. The method of claim 1, wherein the filtering each stream of the received signal comprises performing Minimum Mean Square Error (MMSE) filtering.

5. The method of claim 1, wherein detecting the signal for each stream of the new search space comprises performing Maximum Likelihood (ML) signal detection.

6. The method of claim 1, wherein detecting the signal for each stream of the new search space is performed using:

$$\hat{s} = \underset{s \in \hat{C}}{\arg\min} \|y - Hs\|,$$

where $s = [s_1 \ldots s_{N_t}]^T$ denotes a symbol vector transmitted from a transmitting end, $y = [y_1 \ldots y_{N_r}]^T$ denotes a receive signal vector, and H denotes a channel matrix of $N_r \times N_t$.

7. The method of claim 1, wherein acquiring the new search space comprises:
  calculating a reliability of each stream based on:

$$\xi_m^i \triangleq \frac{p(\tilde{s}_i \mid s_i = \rho_m)}{\sum_{j=1}^{M} p(\tilde{s}_i \mid s_i = \rho_j)}, 1 \leq m \leq M,$$

where $\xi_m^i$ denotes a reliability of a symbol candidate $\rho_m$ in an $p(\tilde{s}_i|s_i=\rho_m)$ denotes the conditional Probability Density Function (PDF) for $\tilde{s}_i$, and $\rho_m$,(m=1, ... ,M) denotes one of constellation symbols;
  setting values having a reliability greater than a probability threshold as elements of the candidate set using:

$$N_i = \arg\min_{1 < n \leq M} \left( \sum_{j=1}^{n} \xi_j^i \geq \alpha \right),$$

where $N_i$ denotes a number of symbol candidates included in an i-th stream, $N_i$ indicates a minimum size of a symbol set having a sum of normalized probabilities greater than $\alpha$, the symbol set is defined to $\hat{C}_i$, and the selected candidate set is $\hat{C}_i = \{\rho_1, \ldots, \rho_{N_i}\}$; and
  acquiring the new search space using the candidate set.

8. An apparatus of a receiver in a Multiple-Input Multiple-Output (MIMO) system, the apparatus comprising:
  a filter for filtering each stream of a received signal;
  a candidate set acquirer for acquiring a new search space by calculating a set of candidates having a reliability greater than a threshold with respect to each filtered stream; and
  a detector for detecting a signal for each stream of the new search space,
  wherein the filtering is performed using:

$$G = \left( H^H H + \frac{\sigma_n^2}{\sigma_s^2} I \right)^{-1} H^H,$$

where H denotes a channel matrix of $N_r \times N_t$, $(\ )^H$ denotes a Hermitian transpose operation, $(\ )^{-1}$ denotes an inverse function, and $\sigma_s^2$ denotes a variance.

9. The apparatus of claim 8, further comprising:
  a Log Likelihood Ratio (LLR) calculator for calculating a soft LLR value for each of the signal-detected streams.

10. The apparatus of claim 8, wherein the filter comprises a Minimum Mean Square Error (MMSE) filter.

11. The apparatus of claim 8, wherein the detector comprises a Maximum Likelihood (ML) signal detector.

12. The apparatus of claim 8, wherein the signal is detected using:

$$\hat{s} = \arg\min_{s \in \hat{C}} \|y - Hs\|,$$

where $s = [s_1 \ldots s_{N_t}]^T$ denotes a symbol vector transmitted from a transmitting end, $y = [y_1 \ldots y_{N_r}]^T$ denotes a receive signal vector, and H denotes a channel matrix of $N_r \times N_t$.

13. The apparatus of claim 8, wherein the candidate set acquirer acquires the new search space by calculating the reliability of each stream using:

$$\xi_m^i \triangleq \frac{p(\tilde{s}_i \mid s_i = \rho_m)}{\sum_{j=1}^{M} p(\tilde{s}_i \mid s_i = \rho_j)}, 1 \leq m \leq M,$$

where $\xi_m^i$ denotes a reliability of a symbol candidate $\rho_m$ in an i-th stream, $p(\tilde{s}_i|s_i=\rho_m)$ denotes the conditional Probability Density Function (PDF) for $\tilde{s}_i$, and $\rho_m$,(m=1, ... ,M) denotes one of constellation symbols,
  sets values having the reliability greater than the threshold as elements of the candidate set using:

$$N_i = \arg\min_{1 < n \leq M} \left( \sum_{j=1}^{n} \xi_j^i \geq \alpha \right),$$

where $N_i$ denotes z number of symbol candidates included in the i-th stream, $N_i$ indicates a minimum size of a symbol set having a sum of normalized probabilities greater than $\alpha$, the symbol set is defined to $\hat{C}_i$, and the selected candidate set is $\hat{C}_i = \{\rho_1, \ldots, \rho_{N_i}\}$,
  and acquires the new search space using the candidate set.

14. The apparatus of claim 9, wherein the soft LLR value is determined using:

$$L(b_{i,j}) \approx \log \frac{\sum_{s \in \hat{C}_{i,j}^1} \exp\left( -\frac{\|y - Hs\|^2}{\sigma_n^2} \right)}{\sum_{s \in \hat{C}_{i,j}^0} \exp\left( -\frac{\|y - Hs\|^2}{\sigma_n^2} \right)},$$

where $\hat{C}_{i,j}^d$ denotes a subset of $\hat{C}$, which is a set of symbol vectors having $b_{i,j}$ of $d \in \{0,1\}$, $L(\ )$ denotes a soft LLR value and
  when $\hat{L}(b_{i,j}) = \pm\infty$, $b_{i,j}$ is substituted by a value determined using:

$$L(b_{i,j}) \approx \frac{\sum_{s_i \in Q_{i,j}^1} p(s_i \mid \tilde{s}_i)}{\sum_{s_i \in Q_{i,j}^0} p(s_i \mid \tilde{s}_i)} = \frac{\sum_{s_i \in Q_{i,j}^1} \exp\left(-\frac{|\tilde{s}_i \beta_i s_i|^2}{\sigma_{w,i}^2}\right)}{\sum_{s_i \in Q_{i,j}^0} \exp\left(-\frac{|\tilde{s}_i - \beta_i s_i|^2}{\sigma_{w,i}^2}\right)} = \frac{\sum_{s_i \in Q_{i,j}^1} \xi_m^i \Big|_{s_i = \rho_m}}{\sum_{s_i \in Q_{i,j}^0} \xi_m^i \Big|_{s_i = \rho_m}},$$

where $s = [s_1 \ldots s_{N_t}]^T$ I denotes a symbol vector transmitted from a transmitting end, $\tilde{s}_i$, which is defined as the i-th symbol estimation value, is expressed as $\tilde{s}_i = \beta_i s_i + w_i$, $\beta_i = g_i h_i$ denotes a bias generated by a filter, and $$w_i = \sum_{j=1, j \neq i}^{N_i} g_i h_j s_j + v_i$$

denotes a sum of remaining interference and noise.

* * * * *